Sept. 11, 1923.
F. A. KEMPE
AUTOMOBILE SIGNAL
Filed Dec. 21, 1922
1,467,328
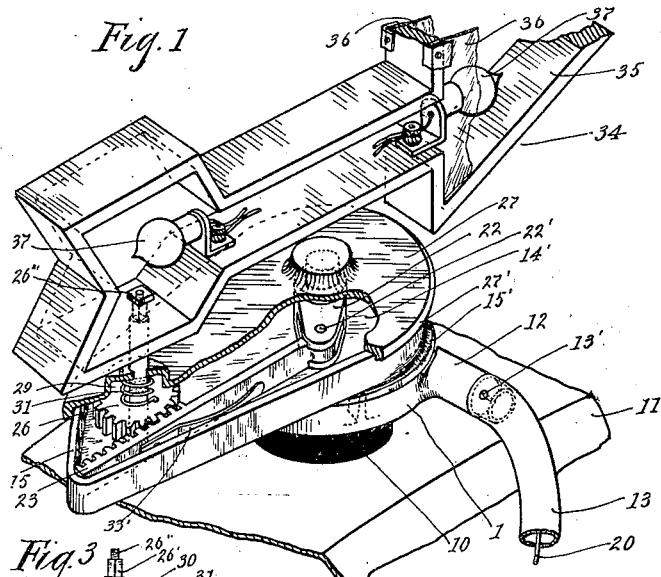
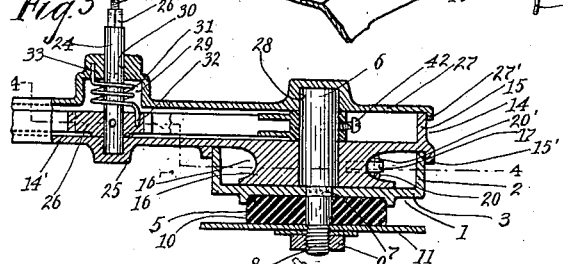
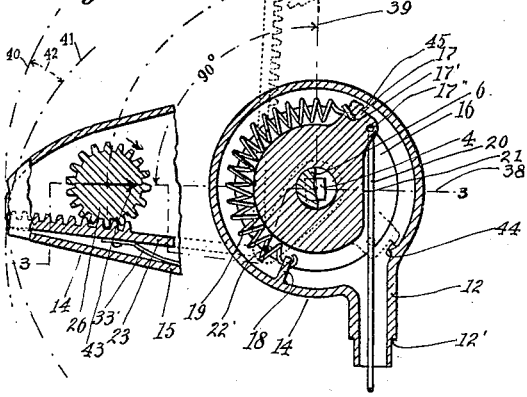
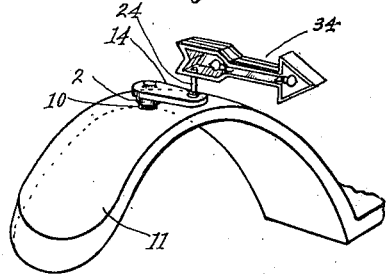
Inventor
Frank A. Kempe
by H. S. Johnson
his Attorney Patented Sept. 11, 1923.

1,467,328

UNITED STATES PATENT OFFICE.

FRANK A. KEMPE, OF ST. PAUL, MINNESOTA.

AUTOMOBILE SIGNAL.

Application filed December 21, 1922. Serial No. 608,174.

*To all whom it may concern:*

Be it known that I, FRANK A. KEMPE, a citizen of the United States, residing at St. Paul, in the county of Ramsey and State of Minnesota, have invented certain new and useful Improvements in Automobile Signals, of which the following is a specification.

This invention relates to illuminated semaphore signals for automobiles for indicating the direction of travel contemplated by the driver, and has for one of its objects the provision of a signal which may be moved from normal to signaling position and back again by simply pulling a wire, and the provision of novel construction whereby a two-part, foldable, jointed arm may be extended to bring the parts into longitudinal alinement by a short pulling movement of the wire to thereby secure a rapid and accurate setting of the signal by the application of a minimum amount of energy.

A further object of the invention is the provision of a signal of the class described, which may be mounted upon the fender or mud guard of an automobile, and is of special non-rigid construction to enable it to yield to sudden vibrations common in fenders, without injury to the parts or rattling thereof, and which may be quickly and conveniently extended an appreciable distance outwardly beyond the body lines of the mud guard.

A still further object of the invention is the provision of a signal device of the class described embodying a novel arrangement of parts, whereby it may be easily assembled, rendered durable against premature wear, and be cheap of manufacture.

Other objects and advantages will be pointed out as this specification progresses, the invention consisting in the construction, combination, and arrangement of parts hereinafter described and specifically claimed.

In the accompanying drawings, forming part of this specification:

Figure 1 is a perspective view of a semaphore signal embodying my invention, shown partly broken away, and in its normal non-signaling position.

Figure 2, is a perspective view of an automobile mud guard, showing the invention mounted thereon.

Figure 3, is a vertical sectional view on line 3—3 of Figure 4; and

Figure 4, is a horizontal sectional view on line 4—4 of Figure 3.

The invention comprises a base 1, having a surrounding circular wall 2 of uniform height, a flat bottom 3, having a squared central opening 4, and a circular recess 5 concentric with the wall 2 in the under side of the bottom 3. Concentric with the wall 2 is the vertically disposed spindle or main pivot 6, having a portion of reduced diameter squared at 7 to loosely fit the opening 4 to secure it against rotation, and threaded at 8 to receive the nut 9. The reduced portion extends through a washer 10, made of resilient material, such as rubber, which washer fits in the recess 5 and rests upon the mud guard 11, so that the base 2, the washer 10, and the mud guard may be firmly bolted together, as shown in Figure 3.

The base is further formed preferably with a tubular branch 12 to form a passage extending tangentially through the wall 2, the outer extremity of the branch being preferably formed with a reduced neck portion 12' adapted to receive the end of the flexible conduit 13, which may be secured thereto as by means of a screw 13'.

Mounted for rotation in a horizontal plane on the spindle is the hollow arm member 14, said member comprising a preferably flat horizontal bottom 14' and a surrounding wall 15. The arm member is oblong in shape, having a semi-circular end wall arranged preferably concentric with the wall 2 of the base and preferably in vertical alinement therewith. The under side of the bottom 14' is formed with a shallow circular recess effected by the surrounding bead 15', which recess loosely receives the base 2, the bead 15' thus serving as a water table to prevent water from entering the base. Projecting concentrically from the recess formed by said bead and rotatably surrounding the stud 6, and having a preferably flat bearing surface resting on the bottom 3 of the base, is the axially vertically disposed drum or sheave 16, having a peripheral groove 16', and a horizontally disposed flat lug 17, which latter extends outwardly in the plane of the drum and is perforated by spaced openings 17' and 17''.

Extending inwardly from the wall 2 of the base, is the lug 18, which latter is located approximately diametrically opposite the lug 17 with respect to the spindle 6, to which lug is attached one end of a coil spring 19, the other end thereof having engagement with the opening 17' of the lug 17. The coil spring is mounted under stress to urge the arm member 14 to the position shown in Figure 1, wherein the arm member is extended longitudinally of the mud guard, which constitutes its normal non-signaling position.

Pivoted in the opening 17'' is the pull rod or wire 20, said wire being bent upwardly at its inner extremity to form a hook or stub end 20', which latter extends through the opening 17''. The wire 20 is preferably made of hard spring steel, such as piano wire, so that it may be pushed as well as pulled, and extends through the metallic conduit 13, which latter leads to a position (not shown) handy to the driver of the automobile. The bottom of the peripheral groove 16' is cut away at 21 to afford clearance for the pull wire, when the arm member is in normal non-signaling position. Obviously, a pull on the wire will cause the signal arm member 14 to be swung to the right around the stud 6 in opposition to the tension of the spring 19.

Rigidly mounted on the spindle 6 within the hollow of the arm member is the pivot support 22, which support carries an axially vertically disposed secondary pivot pin 22', which latter is located diametrically opposite to the point of securement 17'' of the wire. Pivoted on said pin is the gear rack or toothed arm 23, said rack extending normally in a transverse direction relative to the wire 20, to and against the inside of that portion of the wall 15 of the arm member which forms the free outer end thereof, said wall thus forming a stop for the rack. Adjacent the outer end of the arm member is the axially vertically disposed shaft 24, mounted for rotation in the hub 25 forming part of the arm member and carrying rigidly the gear 26, which gear meshes with the rack 23 to be rotated thereby in a manner to be hereinafter explained. The shaft is formed at its top with a squared section 26' and a threaded portion 26'', adapted to receive an ordinary nut. The arm member is further provided with a cover plate 27, preferably formed with a surrounding lip 27' to protect the interior of the base against water and dust. The cover is further formed with a bore 28 adapted to removably receive the spindle 6 to form a support therefor; a circular chamber 29 surrounding the shaft 24, and a bearing 30 for the latter.

Surrounding the shaft 24, within the chamber 29, is the coil spring 31, the ends thereof having connection respectively at 32 with the gear 26, and at 33 with the cover 27. This spring is assembled under stress in a manner to urge the gear to its normal position. A blade spring 33' secured to the rack 23 and engaging under stress the wall 15 of the arm member, urges the rack against the gear 26.

Supported by the shaft is the significative element 34 whereby to warn following vehicles, it being preferably in the form of an arrow, and adapted to be illuminated when desired. As here shown, the arrow comprises a frame 35 having open sides. The sides are suitably closed by a transparent medium 36, such as celluloid and the like. Within the frame I have shown two electric light bulbs 37, which may be connected with a source of current such as the battery of the car, there being one for each end of the arrow. The arrow is preferably formed with an opening adapted to receive the squared portion 26' of the shaft 24 and be held firmly secured thereto by the nut 26''. It will be noted that the arrow is supported at a point adjacent the rear end thereof.

Referring now to Figure 4 of the drawings, it will be noted that the pull wire extends through the branch 12 approximately at right angles across the line 38, which line intersects the axes of the shaft 24 and the spindle 6, to the point of securement 17'' located on the opposite side thereof and outside of the line 39, which intersects the axis of the spindle at right angles to the line 38.

As stated in the foregoing, the rack abuts with its outer free end against the wall 15 when the parts are in their normal position, thereby restricting the movement of the arm member to exact longitudinal alinement with the mud guard.

As the pivot 14' is offset an appreciable distance from the axis of the spindle 6, or in other words, a distance greater than the radius of the gear 26, the rack 23 inclines toward the gear so that the rack is not parallel to the line 38. Therefore, the arc 40, described by the end of the rack in a right hand swinging movement thereof, will intersect the arc 41, which is concentric with the center of the spindle, which arc is traversed by the inside of the wall 15 of the arm member. The rack will thus abut endwise, against the wall at a point corresponding to the point of intersection of said arcs and thereby restrict the swinging movement of the arm. Obviously, the degree of movement of the arm may be changed by adjusting the pivot support 22 on the spindle to move the rack nearer to, or further from the wall as by means of the set screw 42. This is an important feature, as it is desirable to have the arrow exactly in longitudinal alinement with the mud guard, and by using the rack to engage with the wall a special adjustable stop is not required.

Offsetting of the pivot 22' in the manner described, causes the rack to roll on the gear to a degree which is in direct proportion to the distance between the axes of the spindle and the pivot 22', as an extension of said distance will correspondingly increase the angle of divergence between the arcs 40 and 41 as at 42.

In operation, therefore, a swinging movement of ninety degrees of the arm member (as indicated by dotted lines in Figure 4) will cause the gear to be correspondingly moved one-half turn, as indicated by the heavy arrow 43. The arm member and the significative element 34 are thus brought into longitudinal alinement, while the arm member is simultaneously turned to the extent of ninety degrees, to extend at right angles to the mud guard beyond the outer edge thereof, a lug 44 in the base, and a shoulder 45 in the lug 17, being adapted to engage one another to restrict the outward movement of the arm member.

The spring 31 urges the gear in the direction indicated by the arrow in Figure 4, whereby the rack is returned to its normal position and accordingly the arm member is restored to its normal position. This spring, in connection with the spring 33', holds the parts in anti-rattling relation, especially the spring 31, which holds the arrow under yielding stress against severe vibrations of the mud guard.

The rubber washer 10 also functions to render the device readily attachable to mud guards of either straight or curved contours, the washer further functioning to afford a cushion effect for the entire device to further resist sudden jars and vibrations. Thus, I am enabled to use a signal mounted on the mud guard which may be projected to signaling position by a relatively short movement of the operating wire 20, and which will automatically return to its normal position.

While I have shown the device attached to a front mud guard, it is to be understood that it may also be attached to rear mud guards, when desired; an important advantage of my device being that the illuminated significatory element may be extended an appreciable distance, or in its entirety, beyond the edge of the mud guard to render it clearly visible from the rear and at the same time have a compact, neat appearing structure when in normal position.

By using a construction whereby the significatory element may be moved to superposed relation with respect to the arm member when in non-signaling position, the strain on the pivot 6 of the arm member is reduced inasmuch as the length of the signaling device when in use, is reduced by more than half, as the arrow, as indicated, is only slightly longer than the arm member, but completely overlaps the latter.

I claim:
1. A signaling device, comprising in combination with a mud guard, a base adapted to be secured to the mud guard, said base including a vertical main pivot pin and a secondary pivot pin parallel to said main pivot pin and offset laterally therefrom; an arm member mounted on said main pivot pin to render it swingable laterally to position it transversely of the mud guard to bring its free end adjacent the outer edge of the latter; manually operated means for swinging said arm member, a horizontal elongated significatory element normally positioned adjacently directly over said arm member and extending in vertical longitudinal alinement with the mud guard, and connecting mechanism between said element and arm member, comprising a vertical shaft mounted for rotation in said arm member and having rigid connection with the adjacent end of said element; a gear concentric with said shaft and rotating therewith, and a gear rack in mesh with said gear, extending to said secondary pivot pin and engaging therewith to swing thereon concurrently with a swinging movement of said arm member, to thereby impart rotary movement to said gear, for the purpose set forth.

2. A signaling device, comprising in combination with a mud guard, a base adapted to be secured to the mud guard, said base including a vertical main pivot pin and a secondary pivot pin parallel to said main pivot pin and offset laterally therefrom; an arm member mounted on said main pivot pin to render it swingable laterally to position it transversely of the mud guard to bring its free end adjacent the outer edge of the latter; manually operated means for swinging said arm member, a horizontal elongated significatory element normally positioned adjacently directly over said arm member and extending in vertical longitudinal alinement with the mud guard; a vertical shaft mounted for rotation in said arm member and secured to the adjacent end of said element, and coactingly connected parts for operatively connecting said shaft to said secondary pivot pin, said parts being constructed to be actuated responsive to a swinging movement of said arm member to impart rotary movement to said shaft and being relatively so proportioned with respect to the degree of offset of said secondary pivot pin as to impart, when actuated by a swinging movement of approximately equal degree to said shaft in a direction opposed to the swinging movement of said arm member.

3. In a signaling device of the class described, the combination with a base, a pivoted arm member mounted on said base to be swingable in a horizontal plane to swing from normal position through an arc of approximately ninety degrees, and manually operated means for actuating said arm member, of an elongated horizontal significatory device having pivotal connection with the free end of said arm member in a manner to swing in a horizontal plane thereon to form an extension thereof when swung into longitudinal alinement therewith, and a device independently pivoted on said base and adapted to operate on said pivotal connection to simultaneously swing said significatory device to the left, responsive to a manually operated swinging movement of said arm member to the right.

4. In a signaling device for use in connection with the mud guard of an automobile, the combination with the mud guard, an elongated arm member normally longitudinally alined therewith, and pivotally supported thereon to swing from normal position thereon to a position transversely thereof, and manually operated means for swinging said arm member; of mechanism, including a vertical shaft carried by said arm member, rendered operative responsive to a swinging movement of the latter to communicate rotary motion to said shaft, said shaft being located adjacent the free end of the arm member, and an elongated horizontal significatory element secured at a point located adjacent its end to said shaft in a manner to enable it to be extended outwardly in longitudinal alinement with said arm member to extend beyond the edge of the mud guard when the arm member is actuated, and to be normally longitudinally alined with said arm member when the latter is in normal position, so as to extend over the top thereof to thereby be spacedly superposed thereon to reduce the strain on the specified pivotal support of said arm member.

5. In a signaling device for use in connection with the mud guard of an automobile, the combination with the mud guard, an elongated arm member normally longitudinally alined therewith, and pivotally supported thereon to swing from normal position thereon to a position transversely thereof, and manually operated means for swinging said arm member; of mechanism, including a vertical shaft, carried by said arm member, rendered operative responsive to a swinging movement of the latter to communicate a rotary movement of approximately ninety degrees to said shaft, the latter being located adjacent the free end of the arm member, and an elongated horizontal significatory element secured near its end to said shaft in a manner to cause it to extend outwardly away from said arm member an appreciable distance beyond the outer edge of the mud guard and be in longitudinal alinement with the arm member when said shaft is rotated approximately ninety degrees.

In testimony whereof I affix my signature.

FRANK A. KEMPE.